United States Patent
Ke et al.

(10) Patent No.: US 11,314,767 B2
(45) Date of Patent: Apr. 26, 2022

(54) TECHNIQUES AND ARCHITECTURES FOR MANAGING CASCADING MUTATIONS IN AN ENVIRONMENT HAVING A DATA LAKE

(71) Applicant: salesforce.com, inc., San Francisco, CA (US)

(72) Inventors: Zhidong Ke, Milpitas, CA (US); Utsavi Benani, Fremont, CA (US); Kevin Terusaki, Oakland, CA (US); Yifeng Liu, Palo Alto, CA (US); Percy Mehta, Foster City, CA (US); Heng Zhang, San Jose, CA (US)

(73) Assignee: salesforce.com, Inc., San Francisco, CA (US)

( * ) Notice: Subject to any disclaimer, the term of this patent is extended or adjusted under 35 U.S.C. 154(b) by 90 days.

(21) Appl. No.: 16/943,314

(22) Filed: Jul. 30, 2020

(65) Prior Publication Data
US 2022/0035829 A1     Feb. 3, 2022

(51) Int. Cl.
| | | |
|---|---|---|
| G06F 16/25 | (2019.01) | |
| G06F 16/28 | (2019.01) | |
| G06F 11/07 | (2006.01) | |
| G06F 16/22 | (2019.01) | |
| G06F 9/54  | (2006.01) | |
| G06F 16/23 | (2019.01) | |

(52) U.S. Cl.
CPC .......... *G06F 16/258* (2019.01); *G06F 9/542* (2013.01); *G06F 11/0772* (2013.01); *G06F 16/2282* (2019.01); *G06F 16/2358* (2019.01); *G06F 16/283* (2019.01)

(58) Field of Classification Search
None
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |

(Continued)

*Primary Examiner* — Christopher J Raab
(74) *Attorney, Agent, or Firm* — Kwan & Olynick LLP

(57) ABSTRACT

Managing mutations in a data lake environment. A mutation request to cause write operations that modify data objects or structures within an environment for collecting unformatted raw data is received. The environment has at least a data table and a notification table. An entry is written to the data table with a streaming job configured to receive and process the mutation request. Entries to the data table specify at least records indicating changes to objects in the environment based on ingestion processing for the environment for collecting unformatted raw data and based on the mutation request. A corresponding entry is written to the notification table in response to a successful write attempt to the data table. The notification table entry has information about data table entries for a specified period. At least one data consumer is notified that the data table has been modified.

18 Claims, 9 Drawing Sheets

(56) References Cited

U.S. PATENT DOCUMENTS

| | | |
|---|---|---|
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman et al. |
| 7,340,411 B2 | 3/2008 | Cook |
| 7,620,655 B2 | 11/2009 | Larsson et al. |
| 10,120,845 B1* | 11/2018 | Palm ................. G06F 16/93 |
| 10,311,079 B1* | 6/2019 | Sylvester ........... G06F 16/252 |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2009/0177744 A1 | 7/2009 | Marlow et al. |
| 2018/0096001 A1* | 4/2018 | Soza .................... G06F 16/235 |
| 2019/0026185 A1* | 1/2019 | Raja .................. G06F 11/2035 |
| 2019/0370599 A1* | 12/2019 | C ....................... G06F 16/338 |
| 2020/0334240 A1* | 10/2020 | Muralidhar .......... G06F 16/256 |

* cited by examiner

TECHNIQUES AND ARCHITECTURES FOR MANAGING CASCADING MUTATIONS IN AN ENVIRONMENT HAVING A DATA LAKE

TECHNICAL FIELD

Embodiments relate to techniques for managing data traffic in environments having a data lake for collecting data from many disparate data sources. More particularly, embodiments relate to techniques for managing data mutations that are to be cascaded through the data lake.

BACKGROUND

A "data lake" is a collection data from multiple sources and is not stored in a standardized format. Because of this, collection of the data in the data lake is not as systematic and predictable as more structured collections of data. Thus, many of the tools that are utilized to ingest data into a data lake (or other data collection structures) do not (or cannot) provide efficient management of data mutations in environments supporting or primarily utilizing batch operations.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
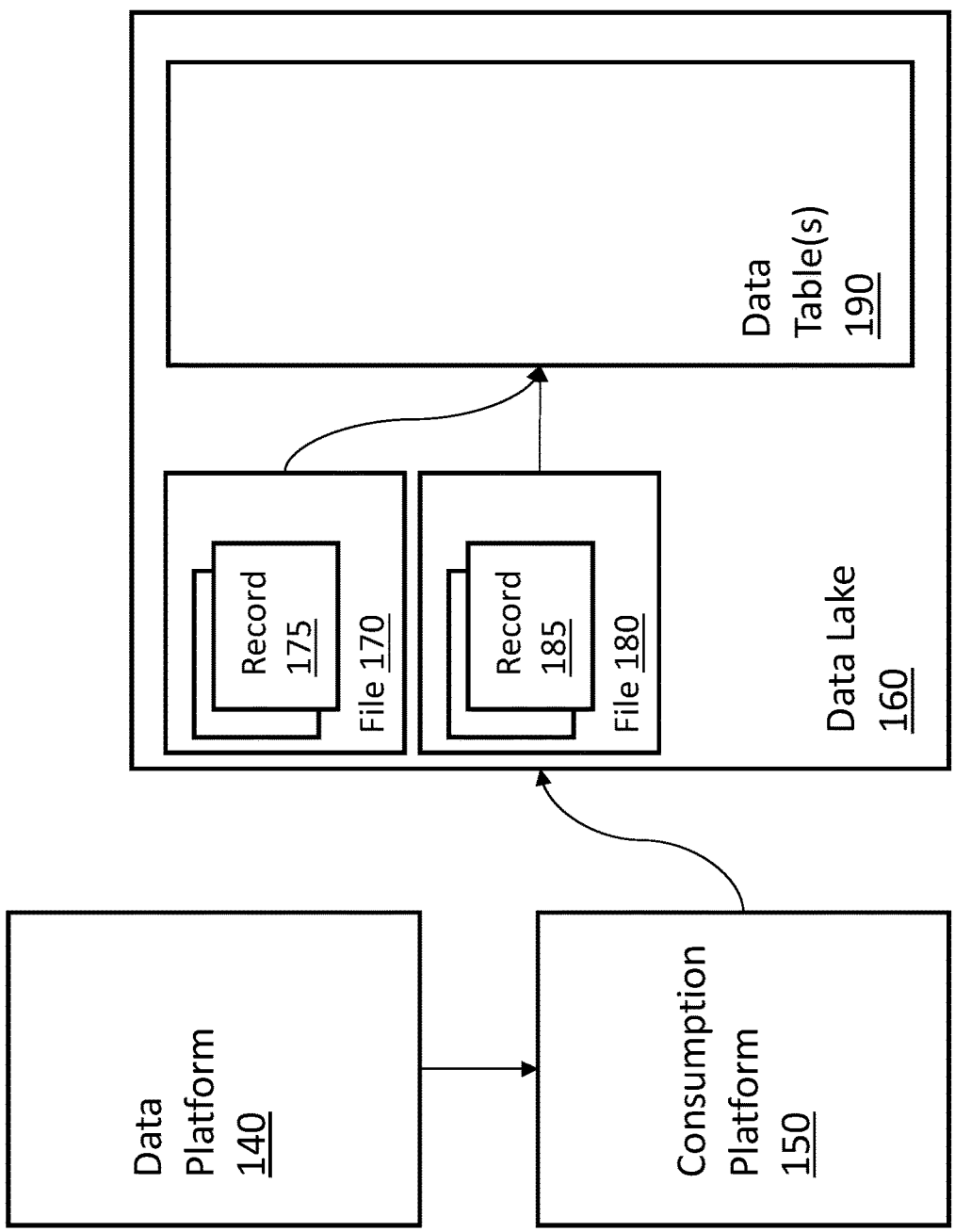
FIG. 1 is a block diagram of an architecture to provide data mutations in a data lake between multiple data sources and multiple data consumers.

In the following description, numerous specific details are set forth. However, embodiments of the invention may be practiced without these specific details. In other instances, well-known structures and techniques have not been shown in detail in order not to obscure the understanding of this description.

In general, a data lake is a data repository that stores data in its native format until the data is needed. Typically, these data repositories are very large and ingest constant (or near constant) data streams for multiple sources. The term "data lake" refers to the strategy of gathering large amounts of natively-formatted data and not to any particular mechanisms for maintaining the repository. Thus, the mechanisms described herein are described as certain embodiments with respect to various components and data flow elements; however, the techniques are more broadly applicable and could be used with other components or in other environments.

Some data lake implementations are based on Apache Hadoop, which provides various software utilities that provide distributed processing of large data sets across multiple computing devices. Other data lake implementations can be based on Apache Spark, which provides a framework for real time data analytics using distributed computing resources. Other platforms and mechanisms can be utilized to manage data lakes (or other large collections of data).

When gathering and managing large amounts of data from many sources, insertion, mutation and deletion of data within the data lake must be supported. Mutations refer to write operations that modify data objects or structures within the data lake (and subsequently data consumers). In some embodiments, data is processed in batches, which can result in mutation requests being cascaded by multiple modifications to the same object. In various embodiments described herein, cascading mutations can be detected in each batch and can be aggregated before the batch is processed.

In some embodiments, the data lake can be utilized to support multiple organizations within a multitenant environment. In these multitenant embodiments, mutation requests come in per-organization batches, and within each batch window, a user can operate any combination of updates to a specific record (e.g., merge field "Lead_1" to "Lead_2" then convert "Lead_2" to "Contact_3"). This can be considered two mutation requests in a batch (e.g., change "ID_1" to "ID_2" and change "ID_2" to "ID_3"). In some embodiments, in order to execute the two mutation requests in a batch against the data lake, pre-processing can be performed on the mutation request(s). If both requests are executed in parallel, the later request will fail because the intermediate record is not in the database.

A tenant includes a group of users who share a common access with specific privileges to a software instance. A multi-tenant architecture provides a tenant with a dedicated share of the software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

FIG. 1 is a block diagram of an architecture to manage data mutations in a data lake between multiple data sources and multiple data consumers. The block diagram of FIG. 1 provides an ingestion mechanism that can efficiently manage cascading mutations to data in a data lake (or other collection of data).

Data platform 140 can provide a structure for handling large data loads. For example, in some embodiments, data platform 140 can be provided utilizing Apache Kafka (or similar architecture). Apache Kafka is an open source platform available from Apache Software Foundation based in Wakefield, Mass., USA. Other stream processing and/or message broker platforms can be utilized in different embodiments.

Continuing with the Kafka example, Kafka provides a unified, high-throughput, low-latency platform for handling real-time data feeds. Kafka is based on a commit log concept and allows data consumers to subscribe to data feeds to be utilized by the consumer, and can support real-time applications. In operation, Kafka stores key-value messages from any number of producers, and the data can be partitioned into topic partitions that are independently ordered. Consumers can read messages from subscribed topics.

Data platform 140 functions to gather various types of raw data from any number of data sources (not illustrated in FIG. 1). These data sources can include, for example, data received via graphical user interfaces (GUIs), location data (e.g., global positioning system (GPS) data), biometric data, etc. Any type of data from any number of disparate data sources can provide data to be gathered via data platform 140.

Consumption platform 150 can provide a mechanism to consume data from data platform 140 and manage ingestion of the data to data lake 160. In some embodiments, consumption platform 150 is a distributed cluster-computing framework that can provide data parallelism and fault tolerance. For example, in some embodiments, consumption platform 150 can be provided utilizing Apache Spark (or similar architecture). Apache Spark is an open source platform available from Apache Software Foundation based in Wakefield, Mass., USA. Other consumption platforms and/or data management mechanisms can be utilized in different embodiments.

Continuing with the Spark example, Spark provides an open source distributed general purpose cluster computing framework with an interface for programming clusters with parallelism and fault tolerance. Spark can be used for streaming of data from data platform 140 to data lake 160. Thus, in various embodiments, large numbers of parallel Spark jobs can be utilized to ingest data to data lake 160.

Data lake 160 functions to store data acquired via data platform 140 and managed/routed by consumption platform 150. In various embodiments, data ingestion can be provided by parallel streaming jobs (e.g., Spark streaming jobs) that can function to consume data in real time (or near real time) and write the data to one or more data tables within data lake 160. Any number of similar parallel structures can be supported.

As described in greater detail below, data in data lake 160 can be managed in batches and can be stored in files (e.g., 170, 180) each having multiple rows/records (e.g., 175, 185). When receiving a mutation request, the corresponding file can be looked up using appropriate constraints (e.g., partition key(s), column(s)). When the file (i.e., the file containing the records to be mutated) has been identified, the records from the file can be loaded to memory and the target record can be mutated based on the request in memory. The new, updated file can then be written to the file system. A notification table (or change log) can be updated to indicate the new version of the file.

In general, data tables(s) 190 is/are written in batches from data contained in file(s) that can contain one or more mutations and/or cascaded mutations. Data table(s) 190 can store data until it is requested or sent to one or more data consumers (not illustrated in FIG. 1), which can be any type of data consumers, for example, analytics platforms, data warehouses, artificial intelligence (AI) platforms, etc.

Figure 2:
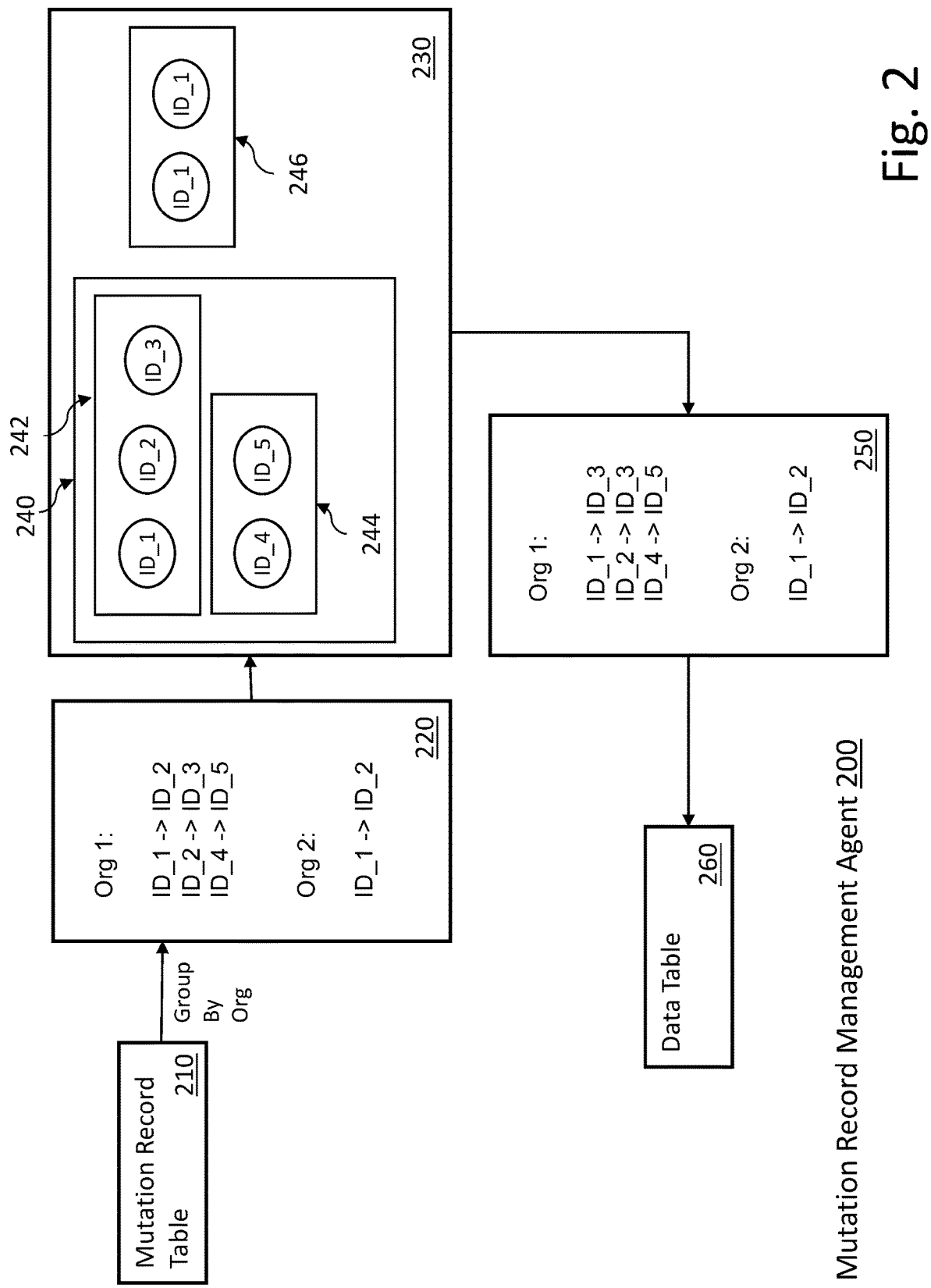
FIG. 2 illustrates an example flow of one embodiment of a technique for managing cascaded mutations in a data lake environment.

FIG. 2 illustrates an example flow of one embodiment of a technique for managing cascaded mutations in a data lake environment. In one embodiment, the flow of FIG. 2 occurs within the data lake (e.g., 160 in FIG. 1). In the example embodiment of FIG. 2, mutation record management agent 200 can be provided by the same platform as provides the data lake or data lake ingestion. In alternate embodiments, other configurations can be supported.

Mutation record table 210 can be used to gather mutation requests from any number of sources (not illustrated in FIG. 2). In some embodiments, mutation record table 210 can stage mutation requests between batch processing of the mutation requests. Thus, in some embodiments, mutation requests can be read from mutation record table 210 and grouped by organization (in a multi-organization environment) to determine mutations per organization ("org"), 220.

In the example of FIG. 2, the following mutation requests are received for batch processing (220):
For ORG_1:
 ID_1 to be changed to ID_2
 ID_2 to be changed to ID_3
 ID_4 to be changed to ID_4
For ORG_2:
 ID_1 to be changed to ID_2

Mutation record management agent 200 can then build one or more graphs (e.g., 240, 246) for each org that has mutation requests in the batch, 230. In some embodiments, the connected components of the graph are converted to one or more sub-graphs (e.g., 242, 244, 246). In one embodiment mutation record management agent 200 can process each node in each sub-graph and determine the corresponding final node, 250. In some embodiments, this processing is based on execution time.

The mutations determined by the processed subgraphs, 250, can be applied to the appropriate data table(s) 260 in a batch. In some embodiments, a notification table (not illustrated in FIG. 2) can be updated to indicate a new version of data table 260.

Figure 3:
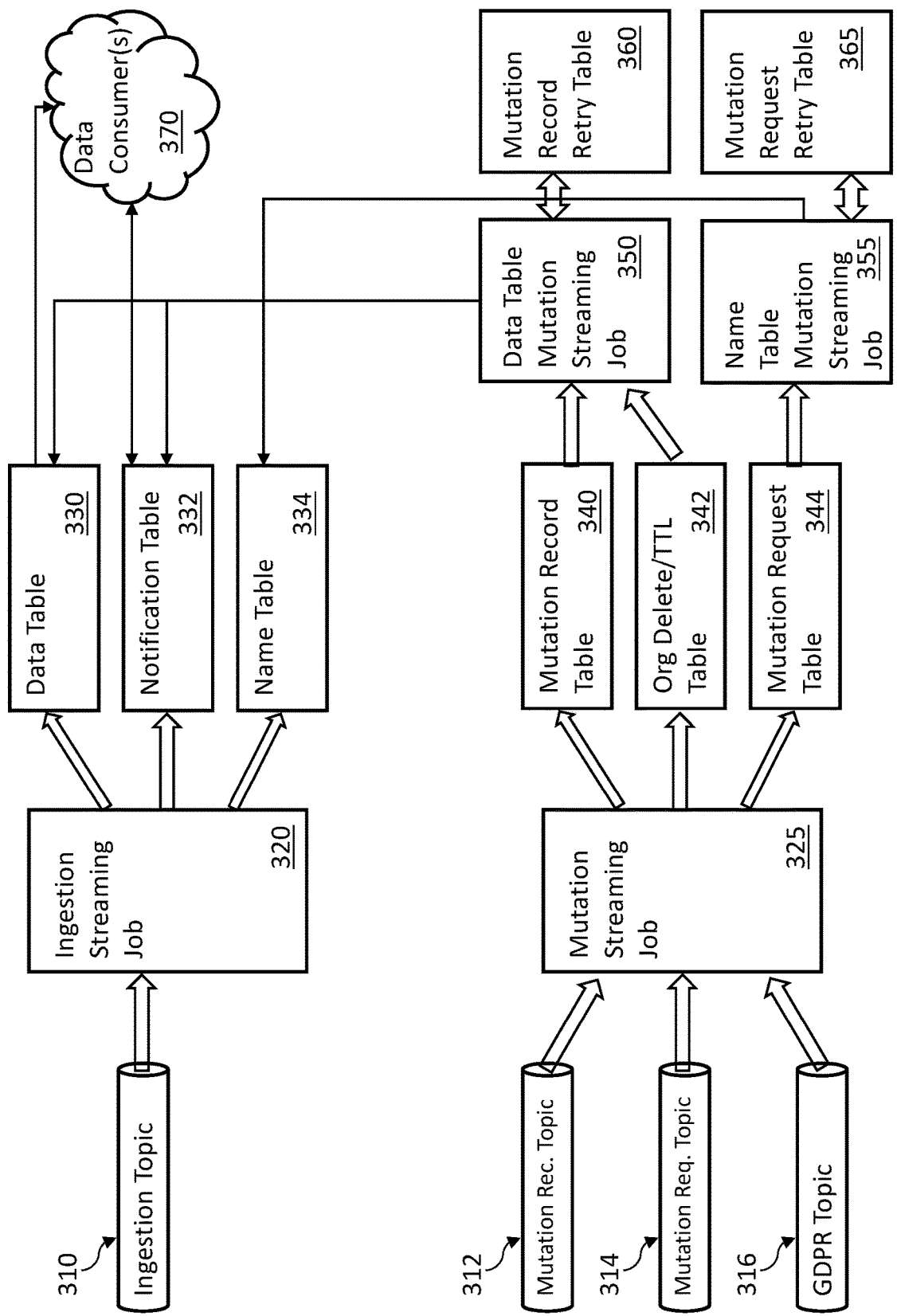
FIG. 3 illustrates an example data flow for one embodiment of an architecture to manage cascading mutations in a data lake environment.

FIG. 3 illustrates an example data flow for one embodiment of an architecture to manage cascading mutations in a data lake environment. The example embodiment of FIG. 3 utilizes the example Kafka and Spark based structures discussed in the description of FIG. 1. Alternate architectures can also be utilized.

In one embodiment, mutation requests can come from any number of sources. In the Kafka-based example, the mutation requests can come via topics (e.g., ingestion topic 310, mutation record notification topic 312, mutation request notification topic 314, general data protection regulation (GDPR) global broadcast topic 316). Incoming data to be ingested into the data lake and incoming mutation requests can be managed utilizing two or more Kafka topics (or similar structures).

Consumption of data from the various topics can be managed by one or more streaming jobs. In the example of FIG. 3, the streaming jobs can be Spark streaming jobs; however, other streaming platforms can also be supported. In the example of FIG. 3, ingestion streaming job 320 can manage ingestion of data from ingestion topic 310. Mutation streaming job 325 can manage processing of mutation requests from various mutation topics (e.g., 312, 314, 316). Multiple ingestion topics can also be supported.

The streaming jobs (e.g., 320, 325) can write to one or more tables as part of the data flow process. Various techniques for managing writes to the tables are described in greater detail below.

In the illustrated example embodiment, ingestion streaming job 320 writes to data table 330, notification table 332 and name table 334. Mutation streaming job 325 writes to mutation record table 340, org delete/Time to Live (TTL) table 342 and mutation request table 344. Data table 330 and notification table 332 can function to provide records and/or other information to one or more data consumers 370.

In operation, ingestion topic 310 functions to collect data to be ingested into the data lake, which is processed through ingestion streaming job 320. In general, data table 330 provides new (or updated data) to one or more consumers 370. Notification table 332 provides information related to changes and/or availability of data in data table 330. For example, information in notification table 332 can be used to notify one or more data consumers 370 with respect to new data and/or changed data in data table 330. Name table 334 can be used to manage naming information to be utilized by one or more data consumers 370.

Mutation streaming job 325 can function to manage mutation requests with respect to information stored in the data lake. In some embodiments, mutation streaming job 325 writes mutation information to mutation record table 340. In some embodiments, records written to mutation record table 340 are sorted by execution time and/or partitioned by organization (or tenant). Mutation streaming job 325 can write information to org delete/TTL table 342. In some embodiments mutation streaming job 325 writes identifier (ID) and name mutation request information to mutation request table 344.

In some embodiments data table mutation streaming job 350 can read from mutation record table 340 and org delete/TTL table 342 and write to data table 330 and notification table 332. Data table mutation streaming job 350 can utilize mutation record retry table 360 in the event write attempts to data table 330 and/or notification table 332 fail. In some embodiments, data table mutation streaming job 350 can update or delete ID information for records in data table 330 and create notification records to be write to notification table 332. Similarly, name table mutation streaming job 355 can write to name table 334 and can utilize mutation request retry table 365 if the write attempt to name table 334 fails. In some embodiments, name table mutation streaming job 355 can update or delete ID information for name records in name table 334.

Various example embodiments for managing ingestion topic 310 and writing to data table 330, notification table 332 and name table 334 with ingestion streaming job 320 are provided below in FIG. 4. Ingestion streaming job 320 can further write name information to name table 334 using the same technique.

For example, in some embodiments, if writes to both the name table and notification table are successful, the version of the name table is increased and the downstream data consumer(s) is/are notified via an update to the notification table. If writes to both the name table and the notification table both fail, the write to the name table can be retried because the name table write is attempted prior to the notification table write. If, after a pre-selected number of retries the write to the name table still fails the transaction can be terminated and no writes occur to either the name table or the notification table for the current transaction. The table versions will be unchanged so the downstream consumers will have no indication of new data.

Mutation streaming job 325 can manage processing of mutation requests from various topic source (e.g., 312, 314, 316). Mutation record table 340 corresponds to mutation record table 210 as illustrated in FIG. 2. That is, the functionality described with respect to FIG. 2 above can be applied to the architecture of FIG. 3, for example, for the records in mutation record table 340. Similar optimizations can be applied to mutation records stored in other tables as well.

In the example embodiment of FIG. 3, data table mutation streaming job 350 processes records in mutation record table 340 and org delete/TTL table 342 to update records in data table 330 and notification table 332 having mutation requests from one of the mutation topics (e.g., 312, 314, 316). Mutation record retry table 360 can be utilized to manage retries in the event of write failures as discussed in greater detail below in FIGS. 6 and 7.

Name table mutation streaming job 355 can process records from mutation request table 344 to generate updates or deletes for records in name table 334 based on mutation requests from one of the mutation topics (e.g., 312, 314, 316). Mutation request retry table 365 can be utilized to manage retries in the event of write failures as discussed in greater detail below in FIGS. 6 and 7.

Figure 4:
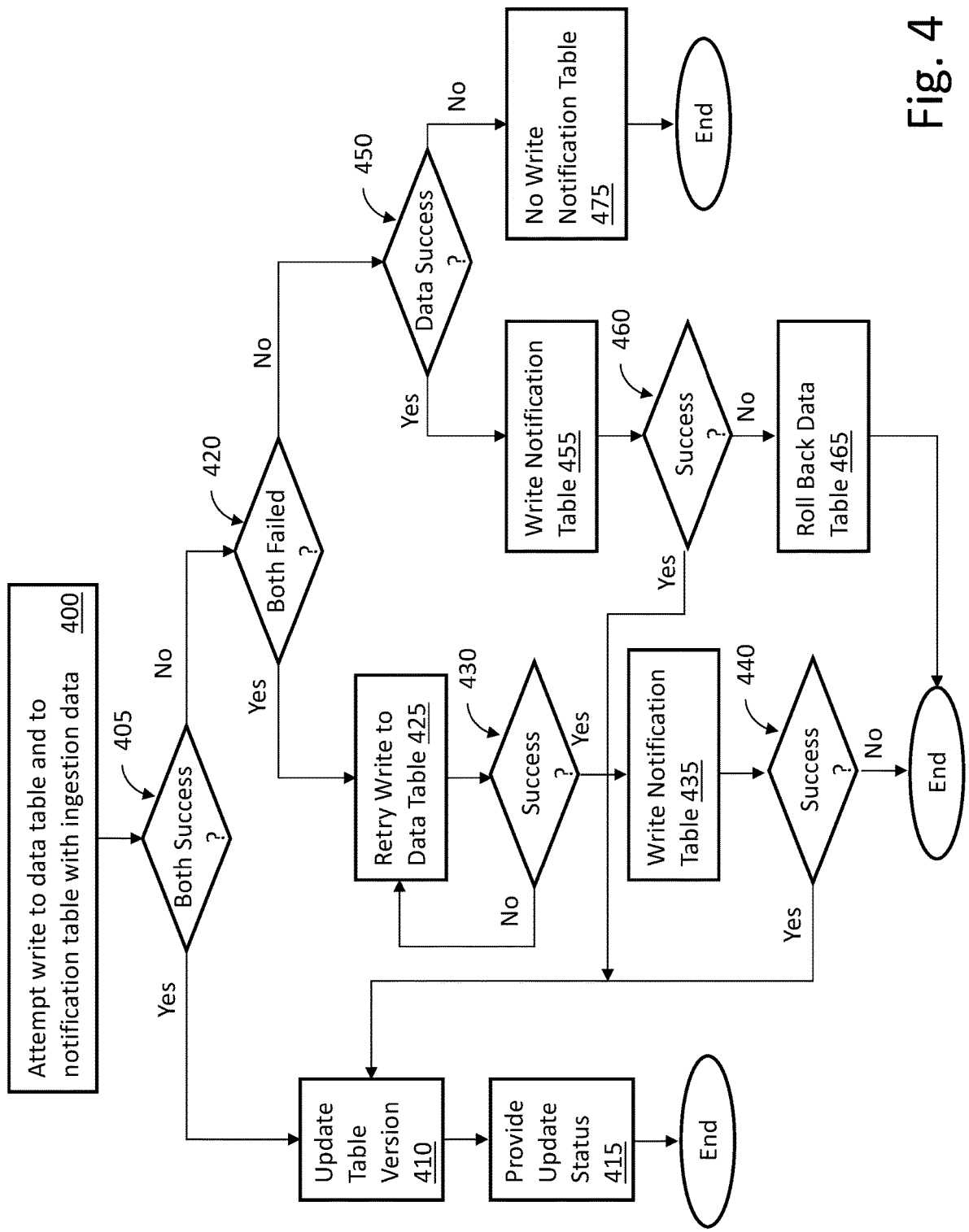
FIG. 4 is a flow diagram of an example embodiment of a technique to provide incremental change information in a data lake environment.

FIG. 4 is a flow diagram of an example embodiment of a technique to provide incremental change information in a data lake environment. The flow illustrated in FIG. 4 can be provided within the context of the architecture of FIGS. 1 and 3. As discussed above, parallel streaming jobs can be utilized to write to a data table and a notification table in parallel in order to provide ingestion management for the data lake.

As described above, this can be accomplished utilizing Apache Kafka and Apache Spark. In alternate embodiments, other specific mechanisms for gathering and ingesting data can be utilized to perform the functionality described with respect to FIG. 4.

The streaming job(s) attempt to write both to the data table (e.g., 330 in FIG. 3) and to the notification table (e.g., 332 in FIG. 3), 400. As discussed above, this can be accomplished via a Spark job or similar mechanism. If the write to the data table and the write to the notification table are successful, 405, then the data table version is updated, 410 and a status update or notification can be provided, 415, to allow one or more downstream data consumers to be informed of the successful writes.

If both the write to the data table and the write to the notification table are not successful, 405, because both the write to the data table and the write to the notification table have failed, 420, then the write to the data table is retried a pre-selected (e.g., 2, 10, 14, 37) number of times, 425. If one of the retries is successful, 430, then another attempt can be made to write the notification table, 435. If the write to the notification table is successful, 440, then the data table version is updated, 410 and a status update or notification can be provided, 415, to allow one or more downstream data consumers to be informed of the successful writes. If the write to the notification table is not successful, 440, then the process can end.

If both the write to the data table and the write to the notification table are not successful, 405, because one of the write to the data table and the write to the notification table have failed, 420, then if the write to the data table was successful, 450, the write to the notification table is retried, 455. In some embodiments, a pre-selected number of retries can be attempted before determining success or failure (e.g., 460). If the retried write to the notification table is successful, 460, then the data table version is updated, 410 and a status update or notification can be provided, 415, to allow one or more downstream data consumers to be informed of the successful writes. If the retried write to the notification table is not successful, 460, then the data table can be rolled back, 465, and the process can end.

If both the write to the data table and the write to the notification table are not successful, 405, because one of the write to the data table and the write to the notification table have failed, 420, then if the write to the data table was not successful, 450, there is no write to the notification table, 475. The process can then end.

In summary, if writes to both the data table and notification table are successful, the version of the data table is increased and the downstream data consumer(s) is/are notified via an update to the notification table. If writes to both the data table and the notification table both fail, the write to the data table can be retried because the data table write is attempted prior to the notification table write. If, after a pre-selected number of retries the write to the data table still fails the transaction can be terminated and no writes occur to either the data table or the notification table for the current transaction. The table versions will be unchanged so the downstream consumers will have no indication of new data.

In some embodiments, if the write to the data table is successful and the write to the notification table fails, the version of the data table is increased but the data table is rolled back to its previous state because the transaction cannot be completed due to the failure of the write to the notification table. No downstream consumer notification is provided. If the write to the data table fails and the write to the notification table succeeds (or could succeed), the version of the data table is not increased and the data is not written to the notification table. No downstream consumer notification is provided.

Thus, only when the writes to both the data table and the notification table are successful will the downstream data consumer be notified of the newly available data. Otherwise, the downstream data consumer will not see any changes. The result is the ability to provide a transaction from the perspective of the downstream consumer within an environment in which data can be ingested from multiple disparate sources having different data formats.

Figure 5:
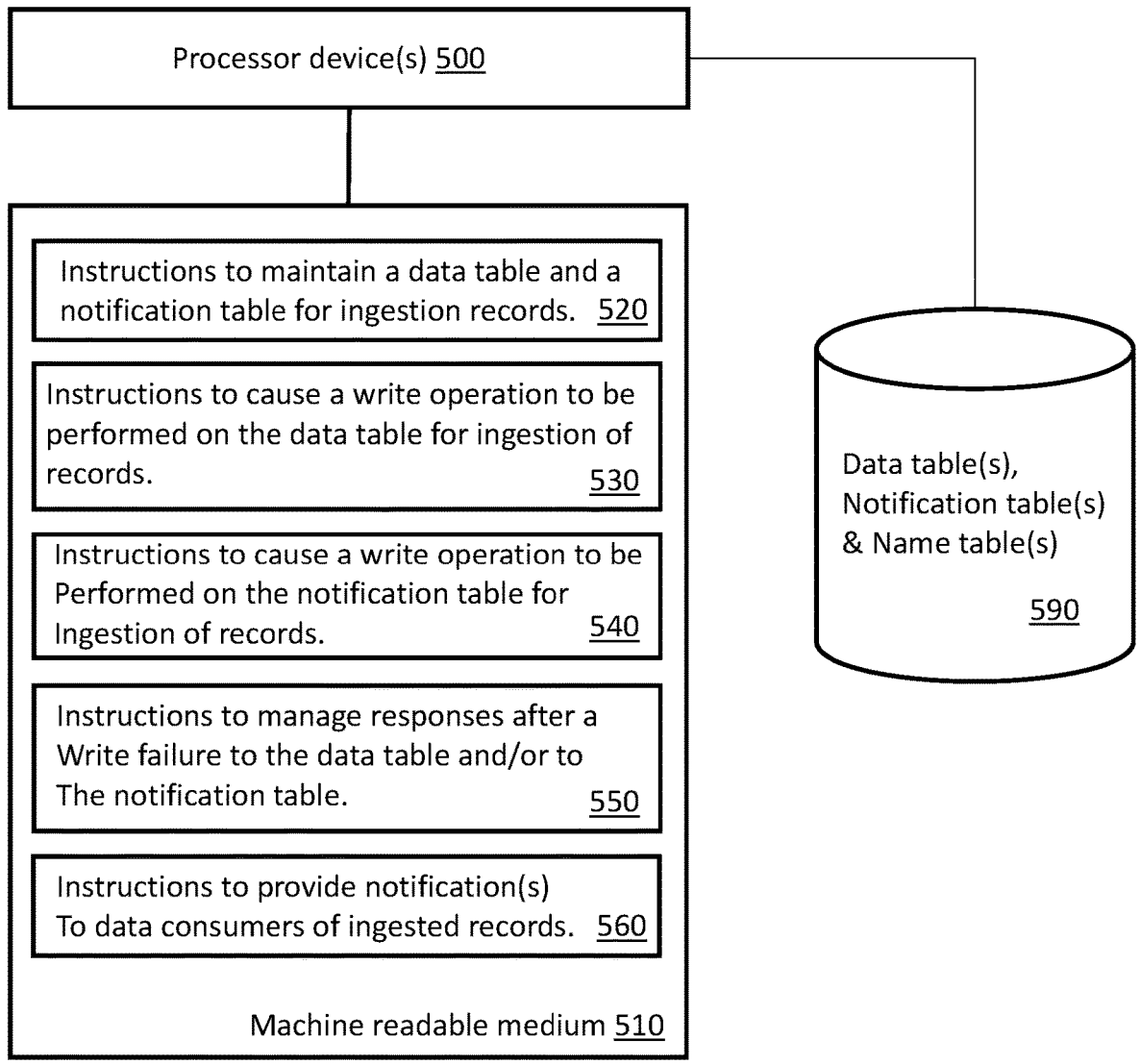
FIG. 5 is a block diagram of one embodiment of a processing resource and a machine readable medium encoded with example instructions to provide incremental change information in a data lake environment.

FIG. 5 is a block diagram of one embodiment of a processing resource and a machine readable medium encoded with example instructions to provide incremental change information in a data lake environment. Machine readable medium 510 is non-transitory and is alternatively referred to as a non-transitory machine readable medium 510. In some examples, the machine readable medium 510 may be accessed by processor device(s) 500. Processor device(s) 500 and machine readable medium 510 may be included in computing nodes within a larger computing architecture.

Machine readable medium 510 may be encoded with example instructions 520, 530, 540, 550 and 560. Instructions 520, 530, 540, 550 and 560, when executed by the processor device(s) 500, may implement various aspects of the techniques for providing atomic transactions as described herein.

In some embodiments, instructions 520 cause processor device(s) 500 to maintain the data table and the notification table. The data table(s) and notification table(s) can be maintained on storage device(s) 590. As discussed above, multiple data tables and notification tables can be maintained and utilized in parallel. In some embodiments, at least a portion of the data table and notification table functionality can be provided in association with open source components (e.g., KAFKA, SPARK). In other embodiments, instructions 520 can provide all of the table functionality. In some embodiments, the described functionality is provided within a multitenant on-demand services environment, example embodiments of which are described below.

In some embodiments, instructions 530 cause processor device(s) 500 to cause a write operation to be performed on the data table(s). As discussed above, data to be ingested and consumed by downstream consumers (not illustrated in FIG. 5) is written to a data table as part of an incremental update process. In some embodiments, the write to the data table happens before the write to the notification table. As described with respect to the flow diagram of FIG. 4, under certain conditions, the write to the data table may be retried. Thus, in some embodiments, feedback from the write operation may be utilized for subsequent instruction functionality.

In some embodiments, instructions 540 cause processor device(s) 500 to cause a write operation to the delta notification table. As discussed above, the write to the data table happens before (or concurrently with) the write to the notification table. As described with respect to the flow diagram of FIG. 4, the handling of the write to the notification table can be dependent upon the success or failure of the write operation to the data table.

In some embodiments, instructions 550 cause processor device(s) 500 to manage responses after a failure to write to the data table and/or a failure to write to the notification table. As discussed above, various responses can be initiated in response to a write failure. The example flow of FIG. 4 provides mechanisms for handling write failures to the data table and/or to the notification table. Alternative embodiments can also be supported.

In some embodiments, instructions 560 cause processor device(s) 500 to maintain the data table and the notification table. As discussed above, in response to successful writes to both the data table and the notification table an update or other indication is provided to downstream (in the data ingestion stream) consumers to allow the consumers to act on the newly available data. In some embodiments, consumers may be notified that the data table and/or the notification table have been updated. In other embodiments, the consumers may periodically check the notification table to determine whether any updates have occurred. A combination can also be supported.

Figure 6:
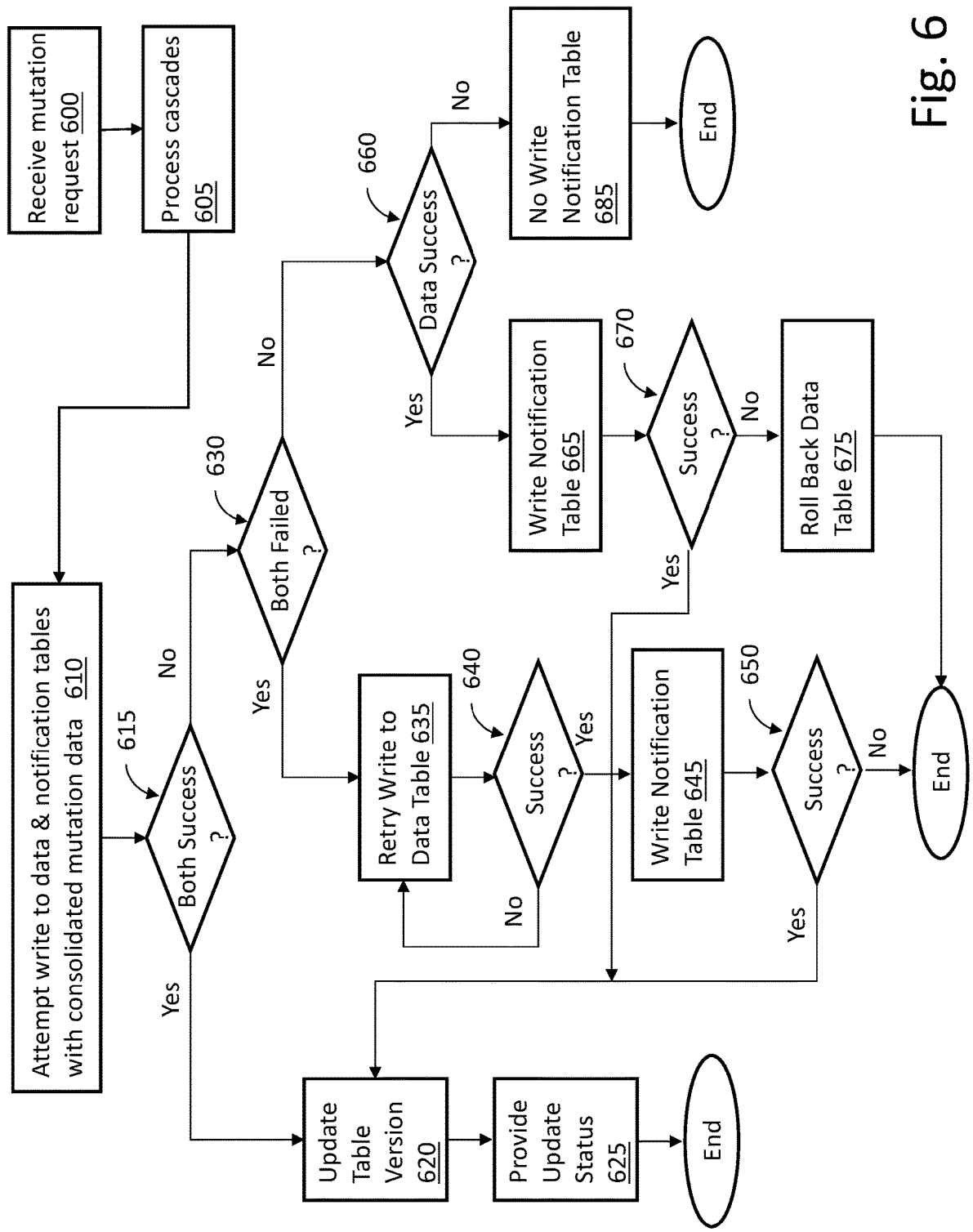
FIG. 6 is a flow diagram of an example embodiment of a technique to provide handling of mutation requests in a data lake environment.

FIG. 6 is a flow diagram of an example embodiment of a technique to provide handling of mutation requests in a data lake environment. The flow illustrated in FIG. 6 can be provided within the context of the architecture of FIGS. 1, 2 and 3. As discussed above, parallel streaming jobs can be utilized to write to a data table and a notification table in parallel in order to provide ingestion management for the data lake.

Mutation requests are received, for example, through one or more topics and utilizing one or more streaming jobs, 600. The mutation requests can include cascaded mutation requests to the same record. The mutation requests can be processed for cascades (and/or other conditions), 605. In one embodiment, the techniques described in FIG. 2 can be utilized to process the mutation requests. Other and/or additional techniques can be utilized as well.

The streaming job(s), for example, data table mutation job 350 in FIG. 3, attempt to write both to the data table (e.g., 330 in FIG. 3) and to the notification table (e.g., 332 in FIG. 3), 610. If the write to the data table and the write to the notification table are successful, 615, then the data table version is updated, 620 and a status update or notification can be provided, 625, to allow one or more downstream data consumers to be informed of the successful writes.

If both the write to the data table and the write to the notification table are not successful, 615, because both the write to the data table and the write to the notification table have failed, 630, then the write to the data table is retried a pre-selected (e.g., 2, 10, 14, 37) number of times, 635. If one of the retries is successful, 640, then another attempt can be made to write the notification table, 645. If the write to the notification table is successful, 650, then the data table version is updated, 620 and a status update or notification can be provided, 625, to allow one or more downstream data consumers to be informed of the successful writes. If the write to the notification table is not successful, 650, then the process can end.

If both the write to the data table and the write to the notification table are not successful, 615, because one of the write to the data table and the write to the notification table have failed, 630, then if the write to the data table was successful, 660, the write to the notification table is retried, 665. In some embodiments, a pre-selected number of retries can be attempted before determining success or failure (e.g., 670). If the retried write to the notification table is successful, 670, then the data table version is updated, 620 and a status update or notification can be provided, 625, to allow one or more downstream data consumers to be informed of the successful writes. If the retried write to the notification table is not successful, 670, then the data table can be rolled back, 675, and the process can end.

If both the write to the data table and the write to the notification table are not successful, 615, because one of the write to the data table and the write to the notification table have failed, 630, then if the write to the data table was not successful, 660, there is no write to the notification table, 685. The process can then end.

In summary, if writes to both the data table and notification table are successful, the version of the data table is increased and the downstream data consumer(s) is/are notified via an update to the notification table. If writes to both the data table and the notification table both fail, the write to the data table can be retried because the data table write is attempted prior to the notification table write. If, after a pre-selected number of retries the write to the data table still fails the transaction can be terminated and no writes occur to either the data table or the notification table for the current transaction. The table versions will be unchanged so the downstream consumers will have no indication of new data.

In some embodiments, if the write to the data table is successful and the write to the notification table fails, the version of the data table is increased but the data table is rolled back to its previous state because the transaction cannot be completed due to the failure of the write to the notification table. No downstream consumer notification is provided. If the write to the data table fails and the write to the notification table succeeds (or could succeed), the version of the data table is not increased and the data is not written to the notification table. No downstream consumer notification is provided.

Figure 7:
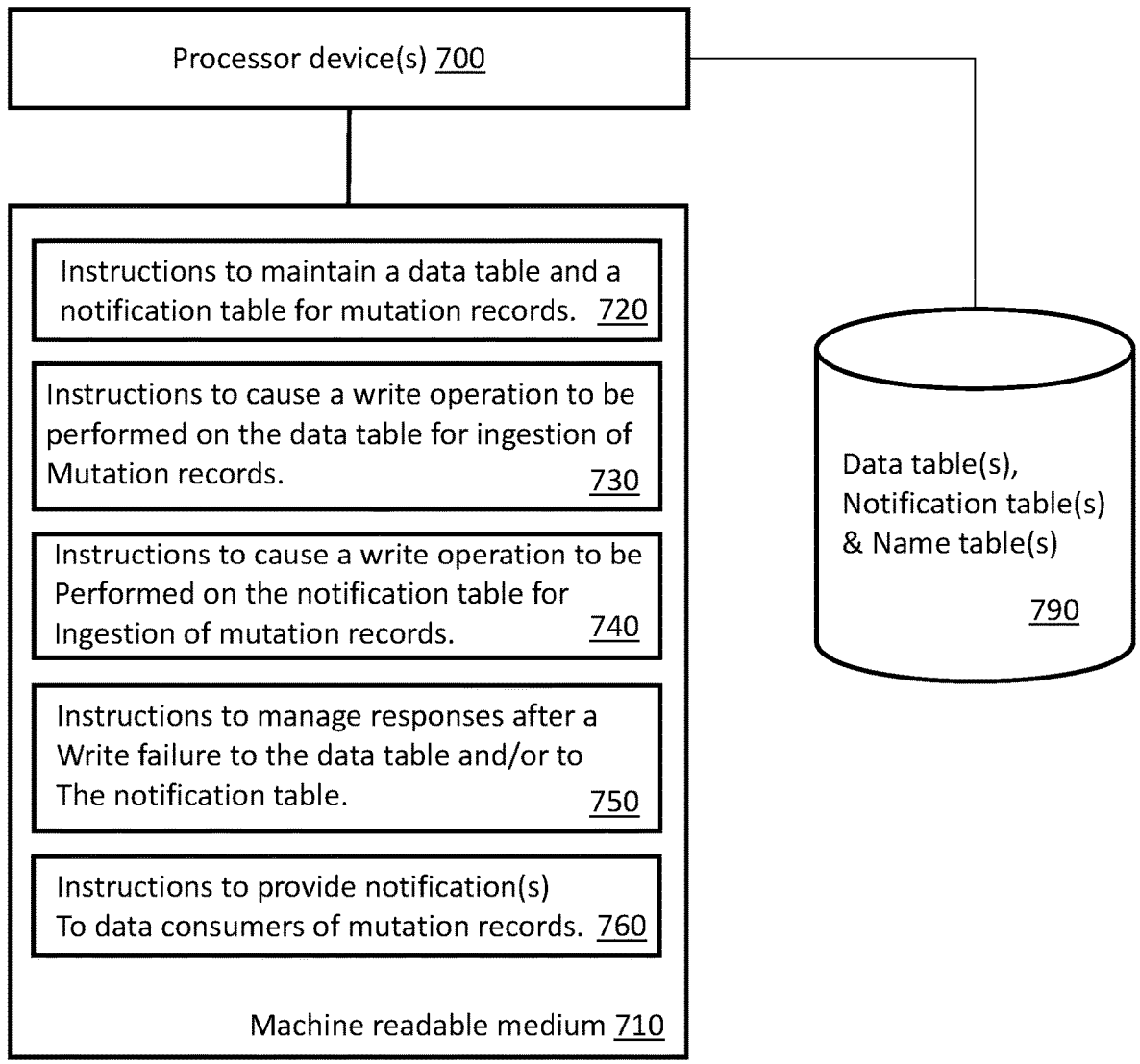
FIG. 7 is a block diagram of one embodiment of a processing resource and a machine readable medium encoded with example instructions to provide handling of mutation requests in a data lake environment.

FIG. 7 is a block diagram of one embodiment of a processing resource and a machine readable medium encoded with example instructions to provide handling of mutation requests in a data lake environment. Machine readable medium 510 is non-transitory and is alternatively referred to as a non-transitory machine readable medium 510. In some examples, the machine readable medium 510 may be accessed by processor device(s) 500. Processor device(s) 500 and machine readable medium 510 may be included in computing nodes within a larger computing architecture.

Machine readable medium 510 may be encoded with example instructions 520, 530, 540, 550 and 560. Instructions 520, 530, 540, 550 and 560, when executed by the processor device(s) 500, may implement various aspects of the techniques for providing atomic transactions as described herein.

In some embodiments, instructions 520 cause processor device(s) 500 to maintain the data table and the notification table. The data table(s) and notification table(s) can be maintained on storage device(s) 590. As discussed above, multiple data tables and notification tables can be maintained and utilized in parallel. In some embodiments, at least a portion of the data table and notification table functionality can be provided in association with open source components (e.g., KAFKA, SPARK). In other embodiments, instructions 520 can provide all of the table functionality. In some embodiments, the described functionality is provided within a multitenant on-demand services environment, example embodiments of which are described below.

In some embodiments, instructions 530 cause processor device(s) 500 to cause a write operation to be performed on the data table(s). As discussed above, data to be ingested and consumed by downstream consumers (not illustrated in FIG. 5) is written to a data table as part of an incremental update process. In some embodiments, the write to the data table happens before the write to the notification table. As described with respect to the flow diagram of FIG. 4, under certain conditions, the write to the data table may be retried. Thus, in some embodiments, feedback from the write operation may be utilized for subsequent instruction functionality.

In some embodiments, instructions 540 cause processor device(s) 500 to cause a write operation to the delta notification table. As discussed above, the write to the data table happens before (or concurrently with) the write to the notification table. As described with respect to the flow diagram of FIG. 4, the handling of the write to the notification table can be dependent upon the success or failure of the write operation to the data table.

In some embodiments, instructions 550 cause processor device(s) 500 to manage responses after a failure to write to the data table and/or a failure to write to the notification table. As discussed above, various responses can be initiated in response to a write failure. The example flow of FIG. 4 provides mechanisms for handling write failures to the data table and/or to the notification table. Alternative embodiments can also be supported.

In some embodiments, instructions 560 cause processor device(s) 500 to maintain the data table and the notification table. As discussed above, in response to successful writes to both the data table and the notification table an update or other indication is provided to downstream (in the data ingestion stream) consumers to allow the consumers to act on the newly available data. In some embodiments, consumers may be notified that the data table and/or the notification table have been updated. In other embodiments, the consumers may periodically check the notification table to determine whether any updates have occurred. A combination can also be supported.

Figure 8:
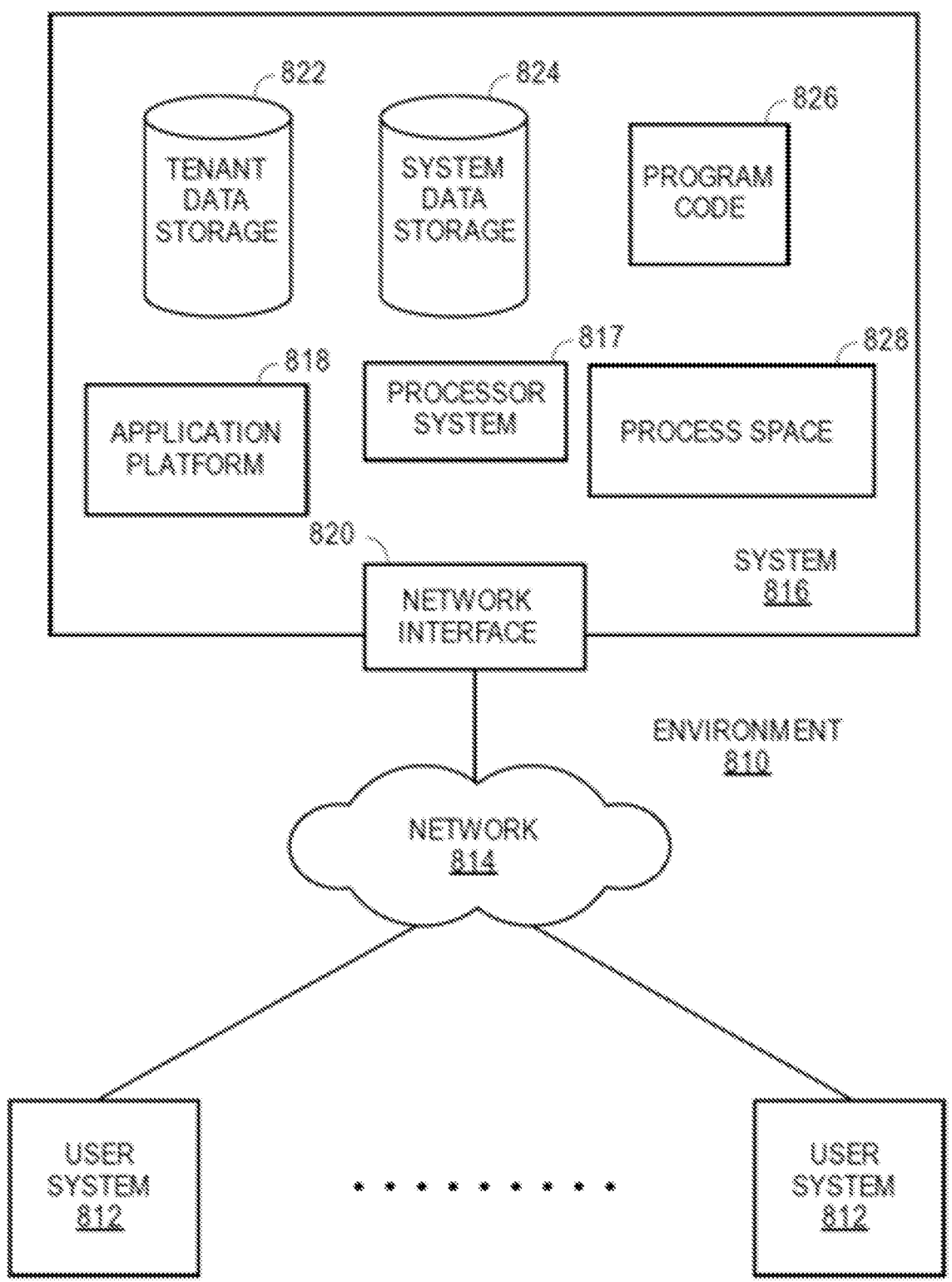
FIG. 8 illustrates a block diagram of an environment where an on-demand database service might be used.

FIG. 8 illustrates a block diagram of an environment 810 wherein an on-demand database service might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in herein FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system has the capacities allotted to that salesperson. However, while an administrator is using that user system to interact with system 816, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Edge from Microsoft, Safari from Apple, Chrome from Google, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a central processing unit such as an Intel Core series processor or the like. Similarly, system 816 (and additional instances of an MTS, where more than one is present) and all of their components might be operator configurable using application(s) including computer code to run using a central processing unit such as processor system 817, which may include an Intel Core series processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
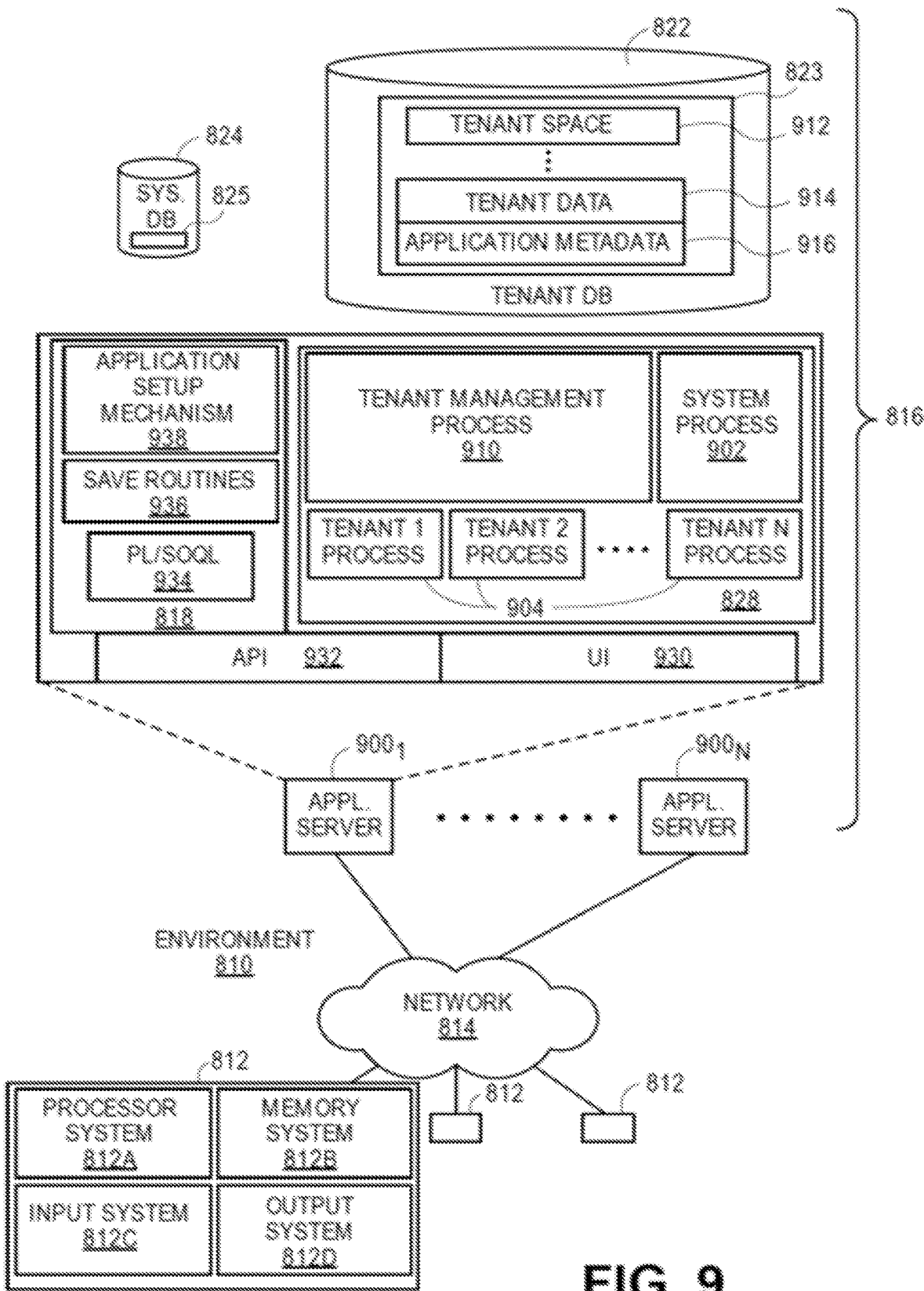
FIG. 9 illustrates a block diagram of an environment where an on-demand database service might be used.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage area 912, user storage 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage areas 912, which can be either a physical arrangement and/or a logical arrangement of data. Within each tenant storage area 912, user storage 914 and application metadata 916 might be similarly allocated for each user. For example, a copy of a user's most recently used (MRU) items might be stored to user storage 914. Similarly, a copy of MRU items for an entire organization that is a tenant might be stored to tenant storage area 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 BIG-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method for managing mutations of data records, the method comprising:
    receiving a mutation request to cause one or more write operations that modify data objects or structures within an environment for collecting unformatted raw data, the environment having at least a data table and a notification table;
    attempting to write an entry to the data table with a streaming job configured to receive and process the mutation request, wherein entries to the data table specify at least records indicating changes to objects in the environment based on ingestion processing for the environment for collecting unformatted raw data and based on the mutation request;
    attempting to write a corresponding entry to the notification table in response to a successful write attempt to the data table, wherein the notification table entry comprises information about data table entries for a specified period;
    notifying at least one data consumer that the data table has been modified utilizing the corresponding entry to the notification table.

2. The method of claim 1 further comprising:
    maintaining a mutation record table having entries corresponding to multiple mutation requests;
    grouping the multiple mutation requests by organization where the environment maintains unformatted raw data for multiple organizations;
    generating one or more mutation graphs based on the multiple mutation requests and the grouping to determine a final value for each sub-graph, each sub-graph corresponding to an organization.

3. The method of claim 1 further comprising:
    retrying the write to the data table a pre-selected number of times or until the write is successful; and
    generating an indication of failure in response to the pre-selected number of unsuccessful write attempts.

4. The method of claim 1 wherein data to be ingested to the environment is received from multiple data sources having disparate native data formats.

5. The method of claim 4 further comprising storing the data in the data table entries in the native data format corresponding to an originating data source.

6. The method of claim 1 further comprising managing multiple data tables and multiple corresponding notification tables to receive data from multiple disparate data sources and multiple mutation sources concurrently.

7. A non-transitory computer-readable medium having instructions stored thereon that, when executed by one or more processors, are configurable to cause the one or more processors to:
    receive a mutation request to cause one or more write operations that modify data objects or structures within an environment for collecting unformatted raw data, the environment having at least a data table and a notification table;
    attempt to write an entry to the data table with a streaming job configured to receive and process the mutation request, wherein entries to the data table specify at least records indicating changes to objects in the environment based on ingestion processing for the environment for collecting unformatted raw data and based on the mutation request;
    attempt to write a corresponding entry to the notification table in response to a successful write attempt to the data table, wherein the notification table entry comprises information about data table entries for a specified period;
    notify at least one data consumer that the data table has been modified utilizing the corresponding entry to the notification table.

8. The non-transitory computer-readable medium of claim 7 further comprising instructions that, when executed by the one or more processors are configurable to cause the one or more processors to:
    maintain a mutation record table having entries corresponding to multiple mutation requests;
    group the multiple mutation requests by organization where the environment maintains unformatted raw data for multiple organizations;
    generate one or more mutation graphs based on the multiple mutation requests and the grouping to determine a final value for each sub-graph, each sub-graph corresponding to an organization.

9. The non-transitory computer-readable medium of claim 7 further comprising instructions that, when executed by the one or more processors are configurable to cause the one or more processors to:
    retry the write to the data table a pre-selected number of times or until the write is successful; and
    generate an indication of failure in response to the pre-selected number of unsuccessful write attempts.

10. The non-transitory computer-readable medium of claim 7 wherein data to be ingested to the environment is received from multiple data sources having disparate native data formats.

11. The non-transitory computer-readable medium of claim 10 further comprising instructions that, when executed by the one or more processors, cause the one or more processors to store the data in the data table entries in the native data format corresponding to an originating data source.

12. The non-transitory computer-readable medium of claim 7 further comprising managing multiple data tables and multiple corresponding notification tables to receive data from multiple disparate data sources and multiple mutation sources concurrently.

13. A system comprising:
    a physical storage system;
    one or more hardware processors coupled with the storage system, the one or more hardware processors to receive a mutation request to cause one or more write operations that modify data objects or structures within an environment for collecting unformatted raw data, the environment having at least a data table and a notification table, to attempt to write an entry to the data table with a streaming job configured to receive and process the mutation request, wherein entries to the data table specify at least records indicating changes to objects in the environment based on ingestion processing for the environment for collecting unformatted raw data and based on the mutation request, to attempt to write a corresponding entry to the notification table in response to a successful write attempt to the data table, wherein the notification table entry comprises information about data table entries for a specified period, and to notify at least one data consumer that the data table has been modified utilizing the corresponding entry to the notification table.

14. The system of claim 13 wherein the one or more hardware processors are configured to maintain a mutation record table having entries corresponding to multiple mutation requests, to group the multiple mutation requests by organization where the environment maintains unformatted raw data for multiple organizations, and to generate one or more mutation graphs based on the multiple mutation requests and the grouping to determine a final value for each sub-graph, each sub-graph corresponding to an organization.

15. The system of claim 14 wherein the one or more hardware processors are configured to retry the write to the data table a pre-selected number of times or until the write is successful, and to generate an indication of failure in response to the pre-selected number of unsuccessful write attempts.

16. The system of claim 13 wherein data to be ingested to the environment is received from multiple data sources having disparate native data formats.

17. The system of claim 16 wherein the one or more hardware processors are configured to store the data in the data table entries in the native data format corresponding to an originating data source.

18. The system of claim 13 further comprising managing multiple data tables and multiple corresponding notification tables to receive data from multiple disparate data sources and multiple mutation sources concurrently.

* * * * *